US012317190B2

(12) United States Patent
Ficara et al.

(10) Patent No.: US 12,317,190 B2
(45) Date of Patent: May 27, 2025

(54) EXTENDING TARGET WAKE TIME FOR RANDOMIZED AND CHANGING MEDIA ACCESS CONTROL ADDRESS SIGNALING

(71) Applicant: Cisco Technology, Inc., San Jose, CA (US)

(72) Inventors: Domenico Ficara, Essertines-sur-Yverdon (CH); Amine Choukir, Ecublens (CH); Roberto Muccifora, Ropraz (CH); Vincent Cuissard, Eteaux (FR); Thomas Vegas, Gland (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 417 days.

(21) Appl. No.: 17/696,343

(22) Filed: Mar. 16, 2022

(65) Prior Publication Data

US 2023/0300751 A1    Sep. 21, 2023

(51) Int. Cl.
*H04W 52/02* (2009.01)

(52) U.S. Cl.
CPC .............................. *H04W 52/0235* (2013.01)

(58) Field of Classification Search
CPC ................................................ H04W 52/0235
See application file for complete search history.

(56) References Cited

U.S. PATENT DOCUMENTS

| 2004/0151149 A1* | 8/2004 | Song | G06F 1/3287 |
| | | | 370/311 |
| 2012/0213211 A1 | 8/2012 | Remaker | |
| 2014/0112225 A1 | 4/2014 | Jafarian et al. | |
| 2018/0332534 A1 | 11/2018 | Hou et al. | |
| 2019/0349397 A1 | 11/2019 | Li et al. | |

(Continued)

FOREIGN PATENT DOCUMENTS

| WO | WO-2018162791 A1 * | 9/2018 |
| WO | WO-2019092307 A1 * | 5/2019 |

OTHER PUBLICATIONS

Carol Ansley, "Status of IEEE 802.11 Randomized and changing MAC address Study Group." IEEE, P802.11—Randomized and Changing MAC Address (RCM) Study Group (SG), https://www.ieee802.org/11/Reports/rcmtig_update.htm, updated: Jan. 29, 2021, 2 pages.

(Continued)

*Primary Examiner* — Charles N Appiah
*Assistant Examiner* — Nicole M Louis-Fils
(74) *Attorney, Agent, or Firm* — Edell, Shapiro & Finnan, LLC

(57) ABSTRACT

Presented herein are techniques for extending Target Wake Time (TWT) to provide for randomizing and changing media access control (MAC) address (RCM) signaling. According to certain embodiments, a client device operating in a wireless network determines a TWT for the client device. Next, the client device determines that it will change from using a first MAC address to a using second MAC address. Finally, the client device generates, for transmission to an access point device that serves wireless communication in the wireless network, a TWT signaling message. The TWT signaling message indicates the TWT for the client device and the second MAC address.

21 Claims, 9 Drawing Sheets

(56) References Cited

U.S. PATENT DOCUMENTS

2020/0084720 A1* 3/2020 Marin ............... H04W 52/0229
2020/0107393 A1* 4/2020 Chu ..................... H04L 1/0003

OTHER PUBLICATIONS

Maddalena Nurchis, et al., "Target Wake Time: Scheduled access in IEEE 802.11ax WLANs," IEEE Wireless Communications, 2019, 14 pages.
Vidurbatra80211, "802.11ax—Target Wake Time (TWT)," 802.11 from my eyes, Wordpress, https://vidurbatra80211.wordpress.com/2019/05/30/802-11ax-target-wake-time-twt/, May 30, 2019, 5 pages.
"Cisco Wireless Controller Configuration Guide, Release 8.10," Cisco, https://www.cisco.com/c/en/us/td/docs/wireless/controller/8-10/config-guide/b_cg810/wlan_security.html, updated: Dec. 11, 2021, 111 pages.

* cited by examiner

EXTENDING TARGET WAKE TIME FOR RANDOMIZED AND CHANGING MEDIA ACCESS CONTROL ADDRESS SIGNALING

TECHNICAL FIELD

The present disclosure relates to communications in networks using randomized and changing Media Access Control address techniques.

BACKGROUND

Target Wake Time (TWT) is a mechanism first specified in the IEEE 802.11ah wireless local area network (LAN) standard, and further enhanced in IEEE 802.11ax, that allows clients to negotiate their sleep times and wake up intervals with their serving access points. In other words, TWT allows client devices to "doze" for some time and then define a timestamp when the client device will wake up for catching up on the latest data that the client device needs to receive. The main purpose of the TWT feature is to help improve client battery life, by the staggering of wake up times of multiple clients with client suggested periodicity rather than having each client wake up after a beacon and contend, all at once, for medium access. Chipset vendors are implementing the TWT feature such that the clients waking up in a Basic Service Set (BSS) can be grouped for minimal contention or optimal communication (using, e.g., orthogonal frequency-division multiple access (OFDMA)).

Another technology leveraged by wireless networks is the technique of randomizing and changing media access control (MAC) addresses (RCM). MAC addresses may be used to identify and track a given wireless client device (sometimes referred to as a "station"). Because this leads to privacy issues, RCM techniques have been introduced to mitigate the privacy concern. Using RCM, a wireless client periodically rotates its MAC address to prevent correlation of a single MAC address to the wireless client over time and across different locations.

DESCRIPTION OF EXAMPLE EMBODIMENTS

Overview

Briefly, presented herein are techniques for extending Target Wake Time (TWT) to provide for randomizing and changing media access control (MAC) address (RCM) signaling. According to certain embodiments, a client device operating in a wireless network determines a TWT for the client device. Next, the client device determines that it will change from using a first MAC address to a using second MAC address. Finally, the client device generates, for transmission to an access point device that serves wireless communication in the wireless network, a TWT signaling message. The TWT signaling message indicates the TWT for the client device and the second MAC address.

According to other embodiments, an access point device that serves wireless communication in a network generates, for transmission to a client device, a TWT signaling message indicating that the client device should change from using a first MAC address to using a second MAC address. The access point device obtains, from the client device, a TWT acknowledgement message. Finally, the access point device maps the second MAC address to the client device.

EXAMPLE EMBODIMENTS

Figure 1:
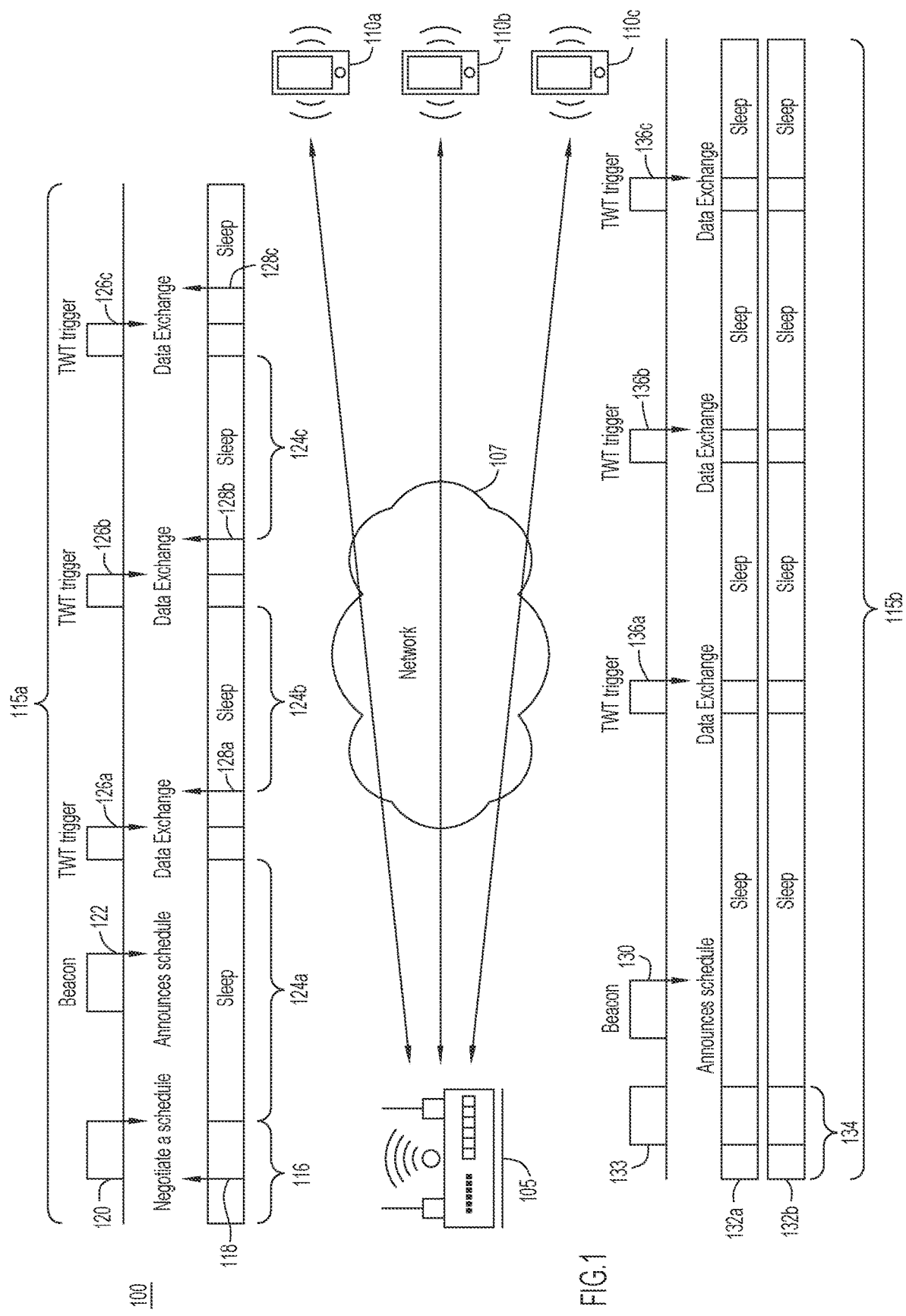
FIG. 1 is a network block diagram illustrating Target Wake Time (TWT) signaling implementing randomized and changing Media Access Control (MAC) address (RCM) techniques, according to an example embodiment.

With reference now made to FIG. 1, depicted therein is a network environment 100 configured to implement randomized and changing Media Access Control (MAC) address (RCM) techniques via target wake time (TWT) signaling. One challenge in implementing RCM techniques is providing clients and infrastructure with a way to negotiate and agree on RCM operations. It may also be challenging to provide a process by which network infrastructure provides hints to client devices for when and how to effectively implement RCM. As will be described in detail below, the techniques presented herein leverage TWT signaling messages to implement RCM. More specifically, TWT signaling messages are used to exchange RCM parameters between wireless network access point devices and client devices. Using TWT signaling to implement RCM may overcome the above-described RCM implementation challenges.

Furthermore, implementing RCM using TWT signaling may facilitate one or more of the following RCM goals. First, RCM should be implemented to avoid MAC address collisions. Specifically, when multiple client devices are changing MAC addresses within the same network, the possibility exists for two client devices to rotate onto the same MAC address. Such collisions should be avoided. Second, RCM implementations may also attempt to maintain the same set of resources before and after rotation of client device MAC addresses. Third, access point devices may attempt to provide hints to client devices about the appropriate time to perform RCM or the risks involved in performing RCM at a particular time. Finally, client devices may attempt to time their RCM MAC address changes in a way that allows the network and network access points to prepare for the MAC address change. Leveraging TWT signaling to implement RCM may permit network environments to meet these goals as the TWT signaling provides a communication channel between access points and client devices, and does so in a way that merges the two techniques in a synergistic manner. Not only does TWT signaling provide a communication channel between client devices and access points that can be leveraged to avoid MAC address collisions, maintain resources before and after MAC address changes, provide hints regarding the appropriate time for MAC address changes, and allow access points to prepare for the changes, but TWT signaling and RCM MAC address changes often overlap in time. For example, client devices are often configured to change their MAC addresses when their data transmission queues are empty. This is often the same time that a client device would preferentially be in a TWT sleep state. Accordingly, a client device may advantageously leverage TWT signaling to communicate its intent to both change its MAC address and enter a TWT sleep state.

To this end, network environment 100 includes an access point 105 and client devices 110a-c (sometimes referred to as "stations") that communicate via wireless network 107. Access point 105 and client devices 110a-c are configured to implement RCM using TWT signaling. As will be discussed in detail below, TWT signaling sequence 115a between access point 105 and client device 110a and TWT signaling sequence 115b between access point 105 and client devices 110b and 110c are both configured to carry RCM data.

By way of background, TWT signaling sequences 115a and 115b are communications between access point 105 and client devices 110a-c that establish the TWT sleep states and TWT data transmission states for client devices 110a-c. In other words, TWT signaling allows for the sharing of information used to implement TWT, including TWT intervals, TWT modes of operation, the identity of the TWT requester, and other parameters. Depending on the type and content of the TWT signaling, the signaling can indicate between the following types and options for TWT:

Broadcast vs. Individual TWT: In broadcast TWT, access points broadcast a TWT message and client devices decide whether or not participate in the TWT. In individual TWT, client devices request individual TWT sessions.
  Periodic vs. "One-Shot" TWT: In periodic TWT, the client device enters a sleep state and repeatedly wakes up at a predetermined interval. In one-shot TWT, the client device enters a sleep state with only one planned wake-up that will not be repeated unless agreed upon through additional TWT signaling.
  Implicit vs. Explicit TWT: In implicit TWT, the next awake interval is implicitly defined by the periodic interval. In Explicit TWT the next awake interval is explicitly signaled at each interval by the access point.
  Announced vs. Un-announced TWT: In announced TWT client devices send frames to request buffered data, while in un-announced TWT the access point delivers data without any prior frame transmission.
  Fixed TWT Requests vs. Negotiated TWT Requests: In fixed TWT either the access point or the client device can be strict with the TWT parameters it is willing to accept, while in negotiated TWT, either the access point or the client device can accept suggestions for different parameters.

The techniques disclosed herein incorporate additional parameters into the TWT signaling messages to permit the TWT signaling to not only implement the above-noted TWT features, but to also implement RCM.

TWT signaling sequence 115a is signaling between access point 105 and client device 110a that implements individual TWT. Signaling sequence 115b, on the other hand, implements broadcast TWT between access point 105 and client devices 110b and 110c. Individual TWT is negotiated per device, allowing more freedom for devices to sleep on their own schedules and not wake as part of a group. Broadcast TWT is used for client devices that want to connect to multicast streams, and access point 105 will control the TWT schedule. According to the techniques presented herein, both individual TWT signaling sequence 115a and broadcast TWT signaling sequence 115b are leveraged by access point 105 and client devices 110a-c, respectively, to implement RCM such that client devices 110a-c may change their MAC addresses and communicate these changes to access point 105 through the TWT signaling messages.

Individual signaling sequence 115a begins with a negotiation phase 116 in which access point 105 and client device 110a agree on a set of TWT parameters. To initiate negotiation phase 116, client device 110a provides TWT Request message 118 to access point 105. TWT Request message 118 specifies the parameters for the TWT session, such as the minimum TWT wake duration, the TWT wake interval and the TWT channel. TWT Request message 118 may be embodied as one of the following types of request messages:

TWT Suggest-type Request Message: The set of parameters included in the request are those that the client device 110a is willing to use, but it will consider accepting an alternative set.
  TWT Request-type Request Message: Client device 110a is willing to set a TWT agreement and lets access point 105 specify the TWT parameters set.
  TWT Demand-type Request Message: Client device 110a wants to set an agreement but will not accept a set of parameters different from the ones in the request message.

In addition to these TWT parameters, client device 110a may also include an RCM value in TWT Request message 118. For example, request message 118 may include a MAC address value that will be used by client device 110a once it wakes up at the TWT time set during negotiation phase 116. Accordingly, the MAC address provided by client device 110a in request message 118 may be different from the MAC address currently being used by client device 110a.

Access point 105 may respond to request message 118 with response message 120, which will be of one of the following types:

TWT Accept Response Message: Access point 105 accepts the request and the TWT agreement is set up with the parameters specified in the request message.
  TWT Alternate Response Message: Access point 105 proposes an alternative set of parameters.
  TWT Dictate Response Message: Access point 105 demands another set of parameters with no possibility for further negotiating them.

In addition to these TWT parameters, access point 105 may also include additional RCM parameters in response message 120. For example, access point 105 may propose an alternative new MAC address for client device 110a to use when it wakes after the agreed upon TWT time.

Upon completion of negotiation phase 116, access point 105 sends beacon message 122 to confirm the TWT parameters set during negotiation phase 116, and client device 110a enters a sleep state 124a.

At the appropriate wake time, access point 105 sends TWT trigger message 126a utilizing the new MAC address specified in the RCM parameters exchanged during TWT negotiation phase 116. Client device 110a may respond to TWT trigger message 126a with response message 128a. Response message 128a may include data to be transmitted via access point 105, as well as additional TWT signaling messages. For example, response message 128*a* may include a next TWT target wake time for the next communication between client device 110*a* and access point 105. Furthermore, because response message 128*a* may include TWT signaling messages, response message 128*a* may also be used to implement additional RCM MAC address changes for client device 110*a*. For example, response messages 128*a* may include a new MAC address that will be used by client device 110*a* when it wakes from its next sleep state 124*b*. In fact, in each communication between access point 105 and client device 110*a* (i.e., each exchange that includes a TWT trigger 126*a*-126*c* and response 128*a*-128*c* that takes place after a sleep state 124*a*-124*c*), access point 105 and client device 110*a* may exchange TWT signaling messages that implement RCM MAC address changes for client device 110*a*.

Broadcast TWT signaling sequence 115*b* similarly implements RCM using TWT signaling messaging, but the signaling messaging and the TWT implementation differ from that of the individual TWT described above. Broadcast TWT allows access point 105 to set up a shared TWT session for client devices 110*b* and 110*c*, and periodically specify the TWT parameters set within beacon frames 130. Client devices 110*b* and 110*c* wake-up periodically to receive the beacon frames 130 containing instructions for the TWT Broadcast sessions to which they belong.

In order to request participation in a Broadcast TWT agreement, client devices send TWT Request messages 132*a* and 132*b*, respectively, to access point 105. Request messages 132*a* and 132*b* may also be sent in response to a participation request message (not shown) sent by access point 105. Similar to the Individual TWT described above, access point 105 and client devices 110*b* and 110*c* enter into negotiation phase 134. Client devices 110*b* and 110*c* can request, suggest or demand the set of TWT parameters of the Broadcast TWT session, and access point 105 can accept or reject the request, or propose an alternative setting, via response message 133. In all cases, the TWT parameters are decided by access point 105. Client devices 110*b* and 110*c* enter a sleep state, and wake up to receive TWT trigger beacons. Trigger beacons 136*a*-136*c* carry the necessary information about the Broadcast TWT session that allow the involved stations to follow the session schedule.

Each of request messages 132*a* and 132*b*, response message 133, beacon frame 130 and beacon trigger messages 136*a*-136*c* may include RCM parameters. For example, request messages 132*a* and 132*b* may include MAC addresses to which client devices 110*b* and 110*c* will switch to for use when they awakening from their next sleep state. Response message 133, beacon frame 130 and beacon trigger messages 136*a*-136*c* may include RCM instructions or suggestions from access point 105 to client devices 110*b* and 110*c*. For example, access point 105 may provide to client devices 110*b* and 110*c* proposed new MAC addresses, functions to generate new MAC addresses, times at which client devices 110*b* and 110*c* should change their MAC addresses, and/or an indication of a time during which client devices 110*b* and 110*c* should not change their MAC addresses.

Figure 2:
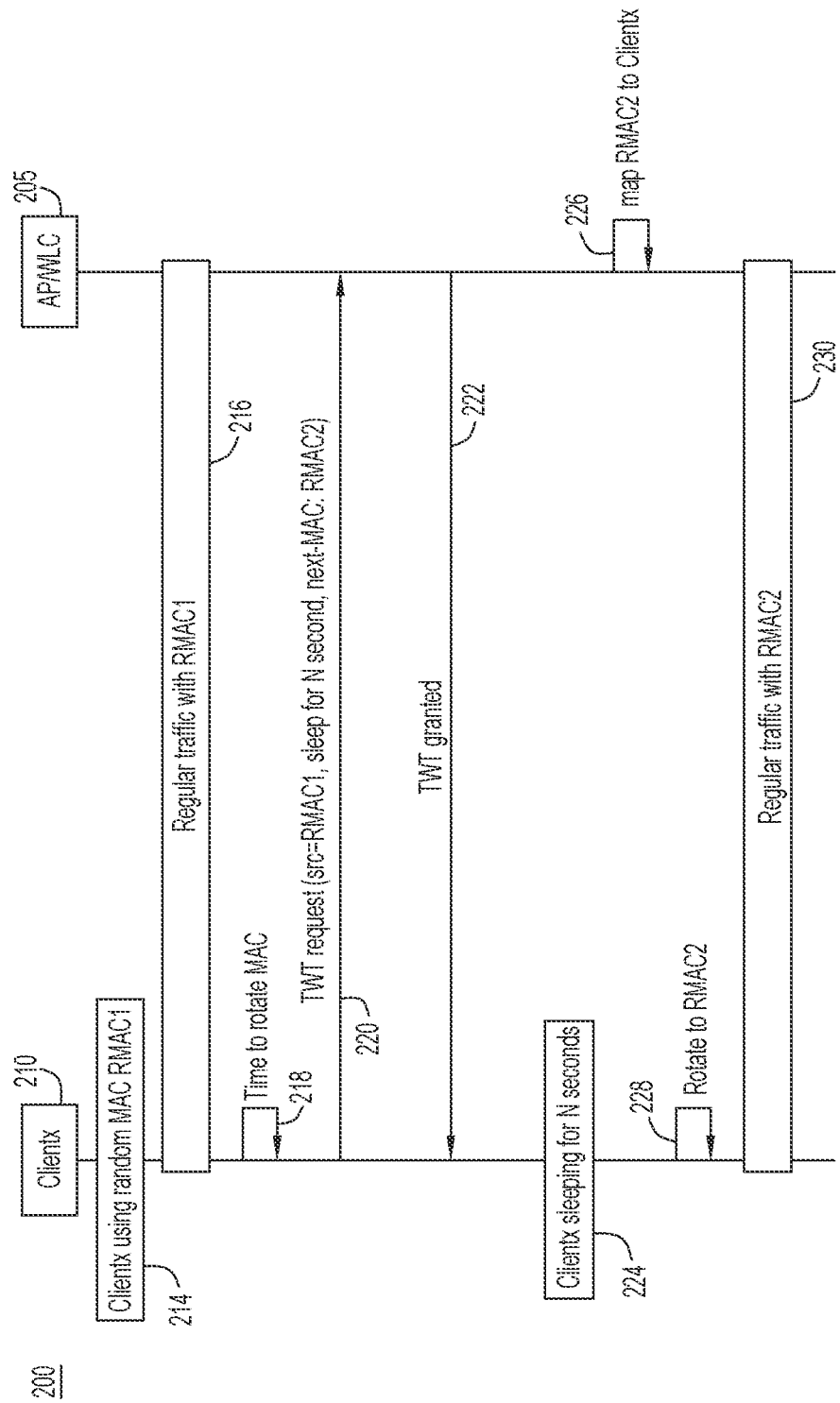
FIG. 2 is a first call flow illustrating a call flow extending TWT to provide for RCM signaling, according to an example embodiment.

Examples of specific call flows/message sequences implementing RCM using TWT signaling between access points and client devices will now be described with reference to FIGS. 2-5. Starting with call flow 200 of FIG. 2, illustrated therein are a sequence of TWT signaling messages in which a client device 210 initiates a TWT signaling exchange that results in the client device 210 rotating to a new MAC address. Call flow 200 begins in operation 214 in which client device 210 establishes a connection in a wireless network using a first random MAC address "RMAC1." In operation 216, traffic is provided from and obtained by client device 210 via access point device 205 using the MAC address of "RMAC1."

In operation 218, client device 210 determines that it is an appropriate time to rotate its current MAC address of "RMAC1" to another MAC address. As noted above, client devices, like client device 210, often determine to perform RCM when their transmission queues are empty. An empty queue may drive such a decision because client device 210 may want to rotate its MAC address at a time when it will not be performing any other operations. Accordingly, the transmission queue for client device 210 may be empty at the time of operation 218. Though, an empty queue is not required for the determination in operation 218.

In response to the determination in operation 218, client device sends TWT Request message 220 to access point device 205. Included in TWT Request message 220 is an indication that client device 210 will enter a sleep state for "N" seconds and also that client device 210 will be using a new MAC address of "RMAC2" when it awakens from the sleep state. In the example of call flow 200, access point device 205 accepts both the TWT parameters and the RCM request, and therefore, sends TWT response message 222 granting the request. Access point device 205 may take actions other than simply confirming TWT Request message 220, which will be described with reference to FIG. 4, below.

As described above, message 220 indicates that "RMAC2" will be the next MAC address for client device 210. To avoid malicious actors tracking the change of MAC address for client device 210, message 220 may be protected using Management Frame Protection (MFP) encryption. MFP may be implemented for all TWT signaling messaged described herein, including those illustrated in FIGS. 1-5.

Upon receipt of TWT response message 222, client device 210 enters a sleep state for "N" seconds in operation 224. In operation 226, access point device 205 maps the new MAC address "RMAC2" to client device 210. This allows access point device 205 to release resources associated with the previous MAC address of "RMAC1" and redirect these resources to the new MAC address for client device 210, "RMAC2." Upon waking, client device 210 rotates to the new MAC address "RMAC2" in operation 228, and in operation 230, client device 210 begins obtaining and providing traffic using the new MAC of "RMAC2."

As shown in call flow 200, client device 210 provides an indication that it will be utilizing the new MAC address of "RMAC2" to access point device 205 shortly prior to entering the sleep state of operation 224. This helps avoid MAC address collisions. For example, by providing an indication of the MAC address "RMAC2" to access point device 205, access point device 205 is provided with an opportunity to ensure that the "RMAC2" does not conflict with another MAC address in use in the network. Furthermore, because access point device 205 has an opportunity to respond to TWT Request message 220, access point device 205 is given an opportunity to suggest other RCM parameters, including alternative MAC addresses, to avoid issues, including MAC address collisions. In other words, the techniques illustrated in call flow 200 allow client device 210 and access point device 205 to negotiate RCM parameters. Examples of such negotiations are described with reference to FIG. 4, below.

Figure 3:
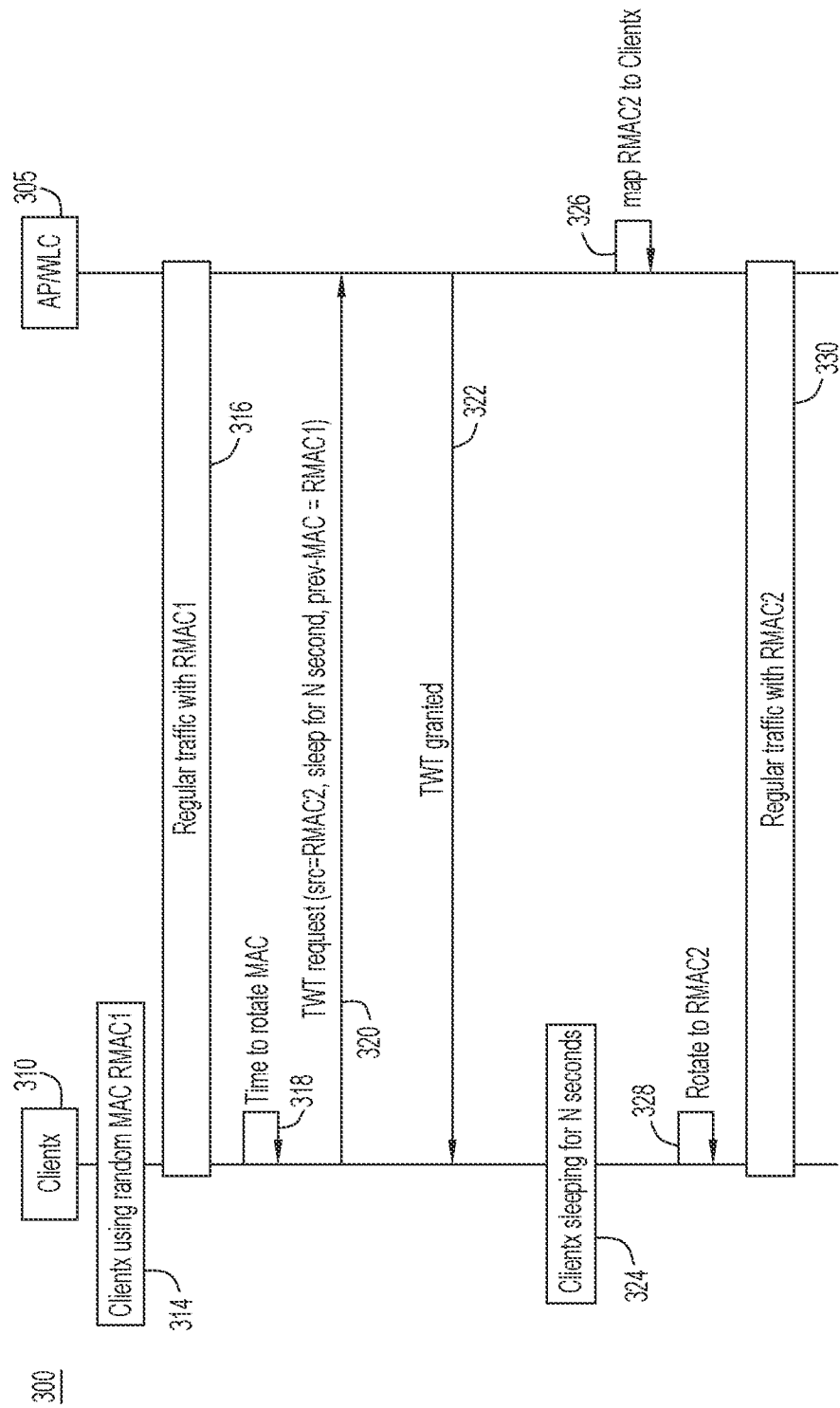
FIG. 3 is a second call flow illustrating a call flow extending TWT to provide for RCM signaling, according to an example embodiment.

With reference now made to FIG. 3, depicted therein is call flow 300, which is similar to that of call flow 200 of FIG.

2. Accordingly, call flow 300 begins with operation 314 in which client device 310 establishes a connection in a wireless network using a first random MAC address "RMAC1." In operation 316, traffic is provided from and obtained by client device 310 via access point device 305 using the MAC address of "RMAC1." In operation 318, client device 310 determines that it is an appropriate time to rotate its current MAC address of "RMAC1" to another MAC address.

Call flow 300 diverges from call flow 200 of FIG. 2 in TWT Request message 320. TWT Request message 220 of FIG. 2 was sent using the original MAC address, "RMAC1," as the source address for client device 210, with a request for the new MAC address of "RMAC2." TWT Request message 320, on the other hand, is sent with a source address of "RMAC2." This allows access point device 205 to treat TWT Request message 320 like a message from a new client device appearing within the network. This type of TWT Request message may allow for access point device 305 to establish a security association under the MAC address of "RMAC2" while providing linkage to the prior MAC address of "RMAC1." Furthermore, access point device 305 may use the TWT wake time of "N" to know when to switch to the security association for the new MAC address of "RMAC2." Call flow 300 and TWT Request message 320 may be particularly suited for situations where the client device 310 knows well in advance that it will be changing its MAC address.

After access point device 305 obtains TWT Request message 320, call flow 300 remains similar to call flow 200 of FIG. 2. Access point device 305 accepts both the sleep request and the RCM request, and sends TWT response message 322 granting the request. Upon receipt of TWT response message 322, client device 310 enters a sleep state for "N" second in operation 324. In operation 326, access point device 305 maps the new MAC address "RMAC2" to client device 310. This allows access point device 305 to release resources associated with the previous MAC address of "RMAC1" and redirect them to the new MAC address for client device 310, "RMAC2." Access point device 305 knows to release the resources associated with "RMAC1" based upon the "pre-MAC="RMAC1" parameter included in TWT Request message 320. Upon waking, client device 310 rotates to the new MAC address "RMAC2" in operation 328, and in operation 330, client device 310 begins obtaining and providing traffic using the new MAC of "RMAC2."

As described above, client device 310 uses "RMAC2" as its source address in message 320 prior to access point device 305 mapping "RMAC2" to client device 310. Certain standards, such as the IEEE 802.11aq standard, forbid a client device from changing its MAC address while still mapped to a previous address. Accordingly, implementing call flow 300 may mean deviating from or altering certain standards.

Figure 4:
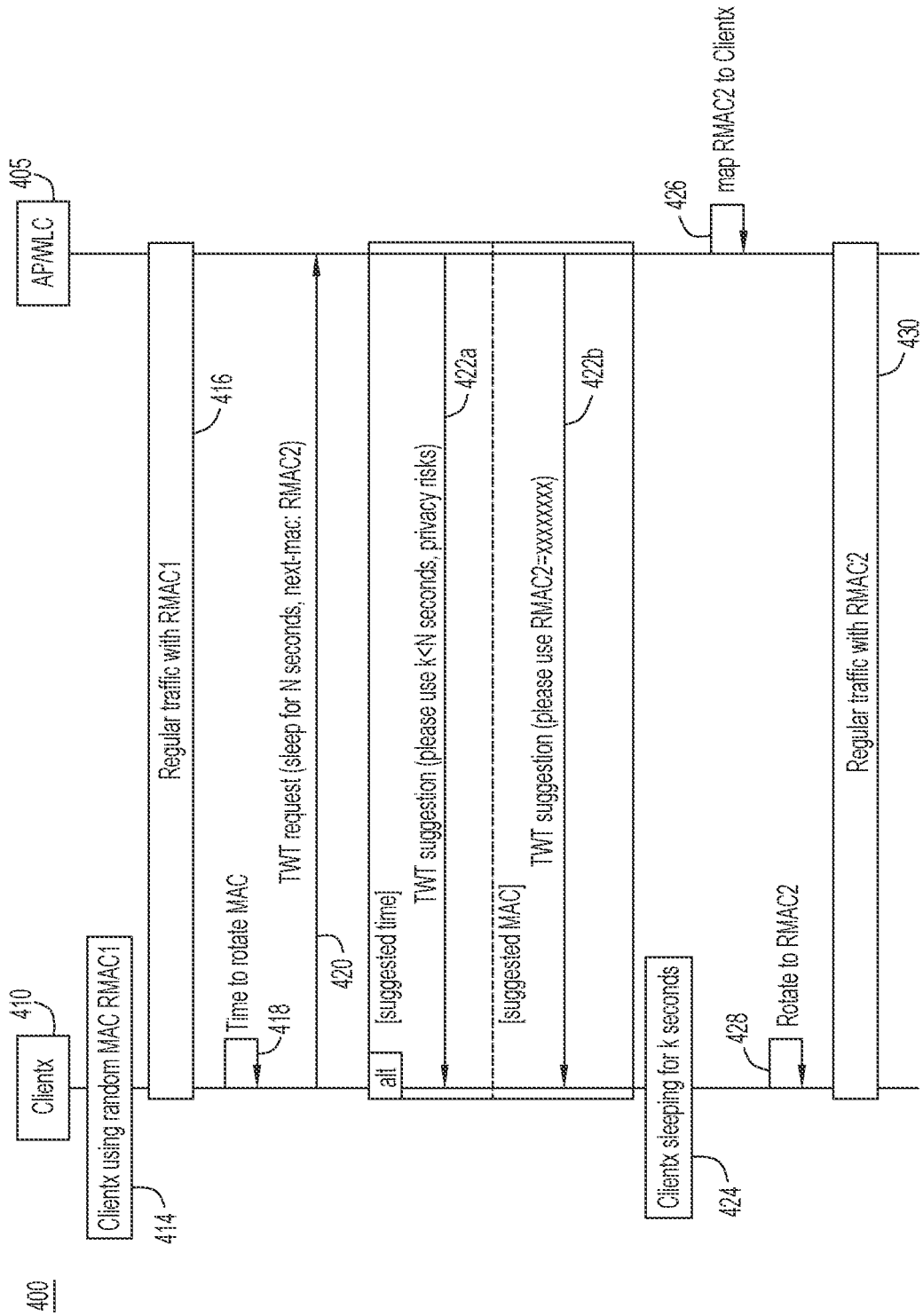
FIG. 4 is a third call flow illustrating a call flow extending TWT to provide for RCM signaling, according to an example embodiment.

With reference now made to FIG. 4, depicted therein is a call flow 400 that is similar to that of call flows 200 and 300 of FIGS. 2 and 3, respectively, but differs in that access point device 405 does not simply accept the terms of TWT Request message 420. Instead, access point device 405 negotiates with client device 410, suggesting alternative TWT and/or RCM parameters. The benefit of the negotiation provided by call flow 400 is that it allows TWT to be extended to allow access point device 405 to suggest a good timestamp and a feedback for a risk-factor for the privacy of client device 410. The negotiation provided by call flow 400 essentially allows access point device 405 to indicate to client device 410 "Your decision to RCM in 'N' seconds from now might be risky, here's the risk factor, do you want to try in 'k' seconds instead."

Call flow 400 begins like call flow 200 of FIG. 2. In operation 414, client device 410 establishes a connection with a wireless network using a first MAC address "RMAC1." In operation 416, traffic is obtained by and provided from client device 410 via access point device 405 using the MAC address of "RMAC1," and in operation 418, it is determined by client device 410 that it is an appropriate time to rotate its current MAC address of "RMAC1" to another MAC address. Client device 410 then provides TWT Request message 420 to access point device 405 that indicates that client device 410 will enter a sleep state for "N" seconds and will be using a new MAC address of "RMAC2" when it awakens from the sleep state. Unlike call flows 200 and 300 of FIGS. 2 and 3, access point device 405 does not simply accept the terms of TWT Request message 420. Instead, access point device 405 responds with one or both of TWT Suggestion response messages 422a and 422b.

TWT Suggestion response message 422a suggest an alternative TWT wake time for the client device 410 due to suspected privacy risks. Specifically, TWT Suggestion response message 422a suggests a shorter sleep time of "k" seconds. TWT Suggestion response message 422b suggest an alternative MAC address for the client device 410 due to for example, security risks or a possible MAC address collision in the network. In other words, TWT Suggestion response message 422b serves as an indication from access point device 405 that the "RMAC2" value provided by client device 410 is not acceptable due to, for example, a collision with another MAC address present in the network. If TWT Suggestion response messages 422a and 422b are embodied as "Dictate" response messages, then client device must accept the terms therein. Such "Dictate" messages may be used if the "RMAC2" value provided in message 420 conflicts with an existing MAC address in the network. If, on the other hand, TWT Suggestion response messages 422a and 422b are embodied as "Alternate" response messages, then client device 410 may accept them, and would respond with an acknowledgment (not shown). If client device 410 refuses the "RMAC2" value proposed in message 422b, access point may take additional actions, such as actions to avoid MAC address collisions, outside the scope of this disclosure.

Assuming client device 410 accepts the terms of TWT Suggestion response messages 422a and 422b, call flow 400 proceeds in a manner similar to call flows 200 and 300 of FIGS. 2 and 3, respectively. Client device 410 enters a sleep state for "k" second in operation 424. In operation 426, access point device 405 maps the new MAC address "RMAC2" to client device 410. Upon waking, client device 410 rotates to the new MAC address "RMAC2" in operation 428, and in operation 430, client device 410 begins obtaining and providing traffic using the new MAC address of "RMAC2."

Figure 5:
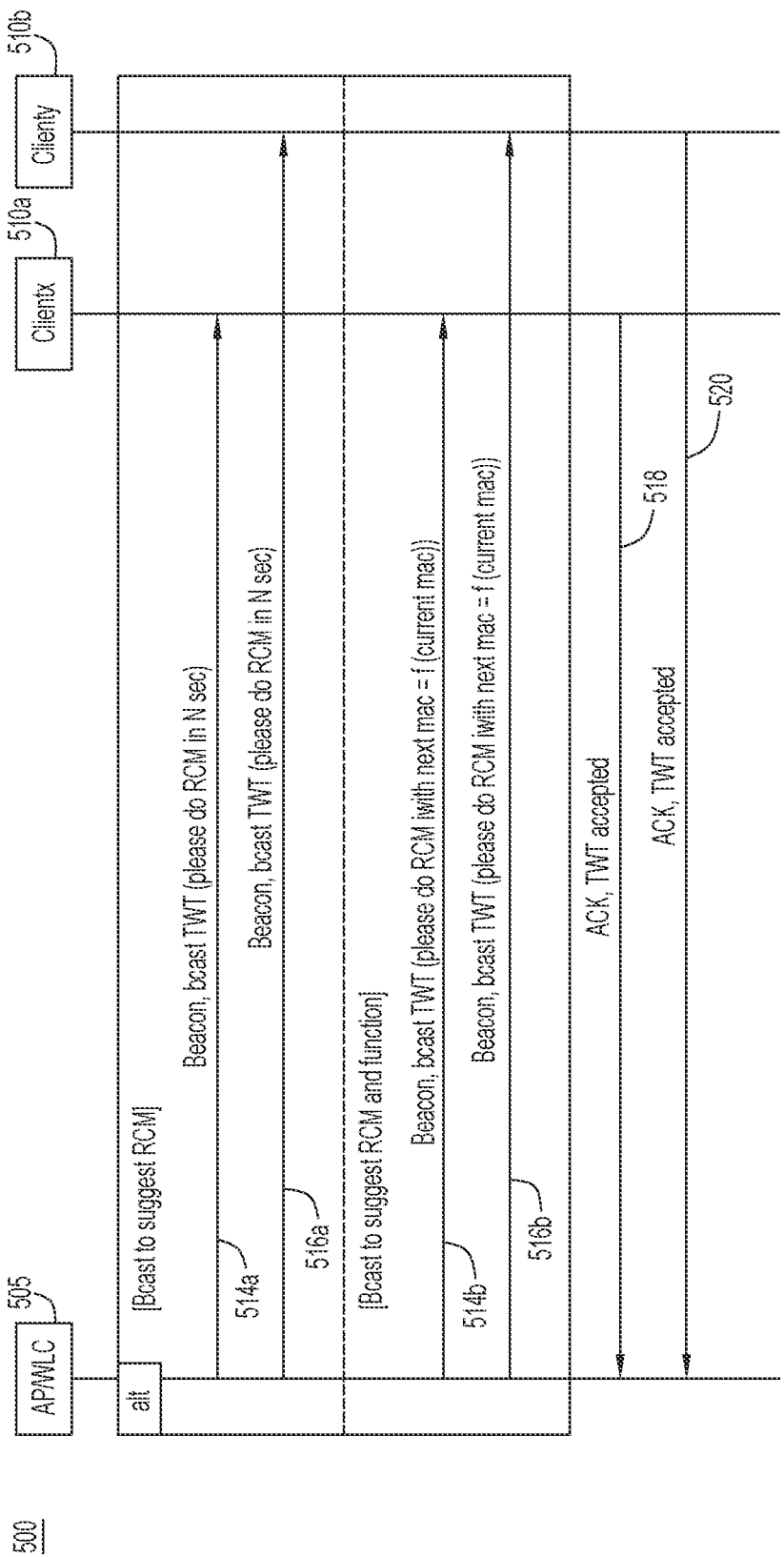
FIG. 5 is a fourth call flow illustrating a call flow extending TWT to provide for RCM signaling, according to an example embodiment.

With reference now made to FIG. 5, depicted therein is a call flow 500. Unlike call flows 200, 300 and 400 of FIGS. 2-4, respectively, the RCM MAC address change illustrated in call flow 500 is in response to a TWT signaling message initiated by access point device 505, not by client device 510a and 510b.

Call flow 500 begins with either TWT Beacon broadcast messages 514a and 516a or TWT Beacon broadcast messages 514b and 516b. TWT Beacon broadcast messages 514a and 516a and TWT Beacon broadcast messages 514b and 516b may be embodied as beacon frames 130 and/or trigger beacons 136a-c from FIG. 1.

As illustrated, TWT Beacon broadcast messages 514a and 516a suggest a time at which client devices 510a and 510b, respectively, should use RCM to change their respective MAC addresses. By using such broadcast TWT signaling messages, access point device 505 may reduce the coordination overhead for RCM by having specific TWT sessions setup for RCM with beacon intervals that suit the deployment scenario in terms of frequency of rotation. In other words, access point device 505 may leverage the TWT beacon message intervals to implement RCM with similar intervals, thereby reducing the overhead needed to implement RCM within a wireless network.

TWT Beacon broadcast messages 514b and 516b, on the other hand, provide functions used by client devices 510a and 510b, respectively, to determine new MAC addresses to use. Accordingly, TWT Beacon broadcast messages 514b and 516b can request all the client devices to simultaneously change their MAC addresses. Furthermore TWT Beacon broadcast messages 514b and 516b enable access point device 505 to inform each of client devices 510a and 510b of which MAC address should be used. Accordingly, TWT Beacon broadcast messages 514b and 516b permit access point device 505 to atomically perform MAC address swaps within the wireless network. In other words, TWT Beacon broadcast messages 514b and 516b may be used to have client devices 510a and 510b swap MAC addresses, with client device 510a switching to the MAC address previously used by client device 510b, and vice versa. As would be understood by the skilled artisan, in an environment with more than two client devices, messages similar to TWT Beacon broadcast messages 514b and 516b may be used to shuffle MAC addresses within a network. Furthermore, access point device 505 may also be part of such a MAC address swapping, swapping its address with those of the client devices within the network. Accordingly, using messages like TWT Beacon broadcast messages 514b and 516b may facilitate the following advantages:

- Avoiding MAC address collision. All of the MAC addresses that were communicating before the swap are the same addresses communicating after the swap. As no new MAC addresses are generated, MAC address collisions may be avoided. MAC address unicity is preserved. Furthermore, this provides benefits when performed at scale as swapping MAC addresses removes the need for frequent random MAC address generation.
- Honeypots. By swapping MAC addresses, a "honeypot" may be created for malicious actors. Because the same MAC addresses are swapped, an attempt to track based on MAC address may result in an entity thinking that they are tracking a single device when in fact the MAC address being tracked is used by any number of client devices.
- Open Systems Interconnection (OSI) model Layer 2 (L2) Infra-Domain Management. Through the above-described MAC address swapping techniques, an access point may exchange all MAC addresses within one L2 domain with the MAC addresses in another L2 domain, avoiding infra-domain issues.
- Clock Synchronization. An access point may maintain a MAC translation that provides an unchanged view of the L2 domain. In other words, client device identifiers may be used internally by an access point, with the internal identifiers mapping to the MAC addresses used within the L2 domain. While the MAC addresses may change using RCM techniques, the internal identifiers will remain unchanged, providing a stable L2 representation on the Ethernet connection for the RCM clients.

Finally, client devices 510a and 510b indicate acceptance of the TWT parameters included in TWT Beacon broadcast messages 514a/b and 516a/b through acknowledgement messages 518 and 520, respectively.

TWT Beacon broadcast messages 514a/b and 516a/b are described above as being broadcast messages. According to other example embodiments, messages 514a/b and 516a/b may be embodied as unicast messages sent specifically to client devices 510a and 510b. Messages 514a/b and 516a/b may also be implemented using Multicast to Unicast (MC2UC) techniques, or such that cryptographic derivation is used by client devices 510a and 510b to derive the value of the next MAC address. Such techniques may provide protection from both insider and outsider attacks.

Figure 6:
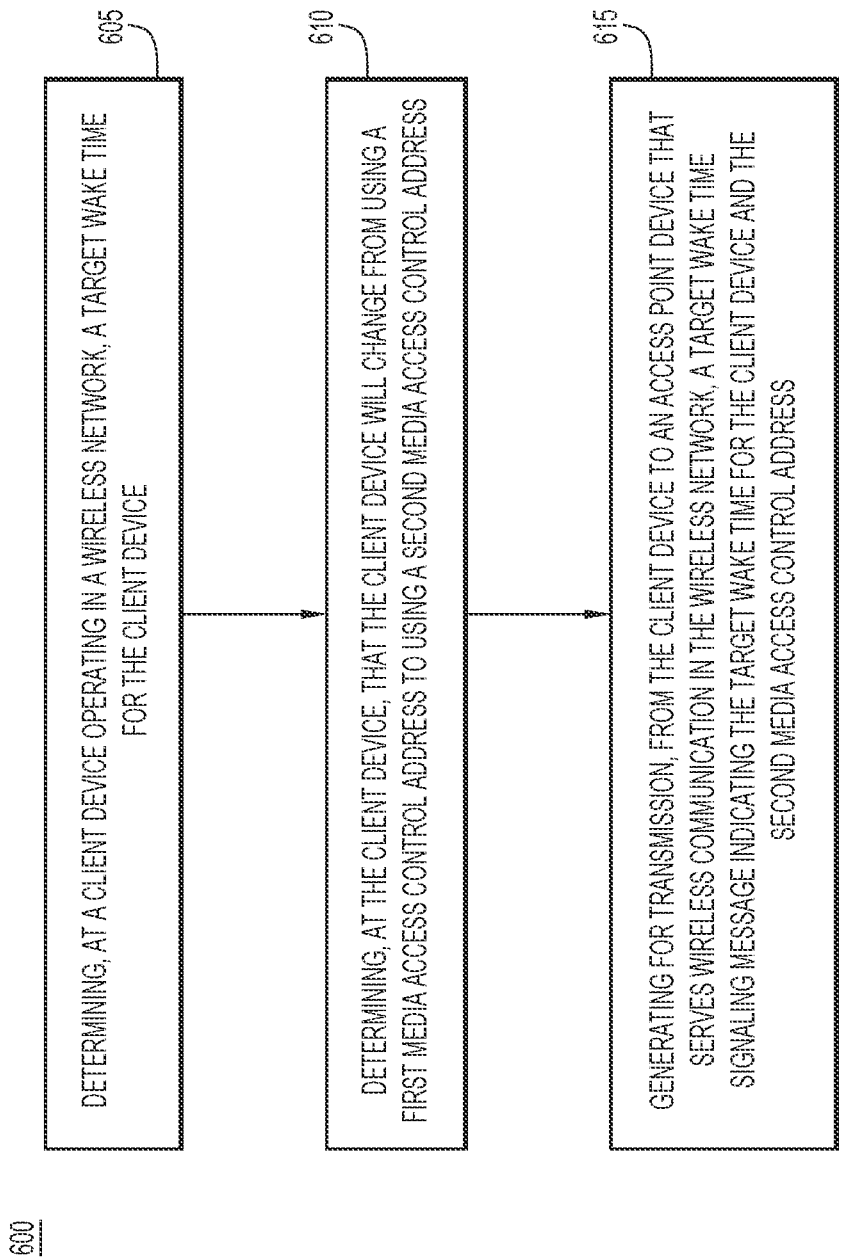
FIG. 6 is a flowchart illustrating a first process flow implementing RCM signaling through TWT, according to an example embodiment.

With reference made to FIG. 6, depicted therein is a flowchart 600 illustrating a first generalized process flow for implementing the RCM via TWT signaling message techniques of the present disclosure. More specifically, flowchart 600 illustrates a process flow of the processes performed and messages obtained and received at a client device. Flowchart 600 begins in operation 605 in which a client device, operating in a wireless network, determines a target wake time for the client device. Operation 605 may be embodied as one or more of client devices 210, 310 and/or 410 of FIGS. 2-4, respectively, determining that it should enter a sleep state.

Next, in operation 610, the client device determines that the client device will change from using a first Media Access Control address to using a second Media Access Control address. Accordingly, operation 610 may be embodied as a determination by a client device that results in the client devices 210 and 310 determining it is time to rotate MAC addresses in operations 216 and 316 of FIGS. 2 and 3, respectively. Operation 605 may also be embodied as a determination by client device 410 that leads to the providing of message 420 of FIG. 4.

Finally, in operation 615, the client device generates a target wake time signaling message indicating the target wake time for the client device and the second Media Access Control address. The client device generates the target wake time signaling message for transmission to an access point device that serves wireless communication in the wireless network. Accordingly, operation 615 may be embodied as client devices 210, 310 or 410 providing messages 220, 320 or 422a/b to access point devices 205, 305 or 405 as illustrated in FIGS. 2-4, respectively.

Flowchart 600 may include more or fewer operations than those illustrated in FIG. 6 without deviating from the techniques disclosed herein. For example, flowchart 600 may include additional operations, including messages and operations 222-230 as illustrated in FIG. 2, operations 322-330 as illustrated in FIG. 3 and/or operations 422a/b and 424-430 as illustrated in FIG. 4.

Figure 7:
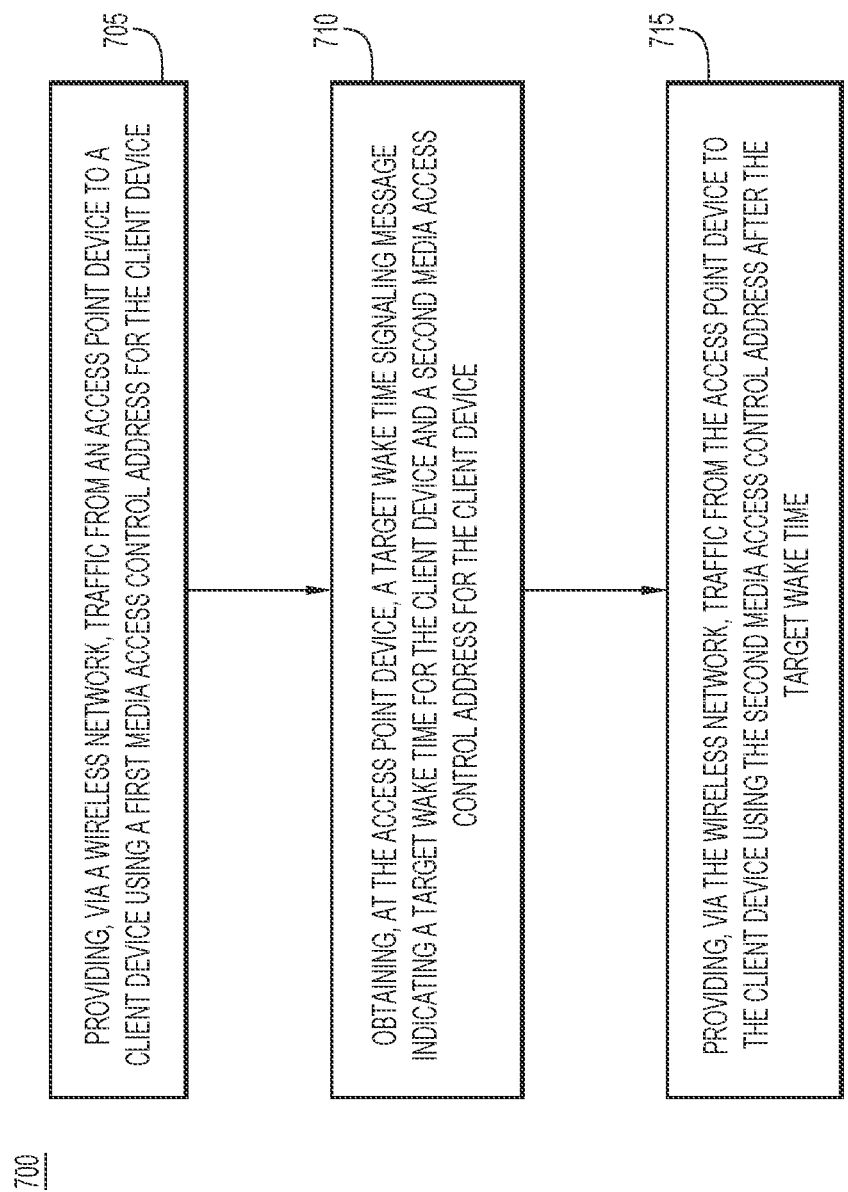
FIG. 7 is a flowchart illustrating a second process flow implementing RCM signaling through TWT, according to an example embodiment.

The techniques disclosed herein also encompass the operations performed by an access point device that complement flowchart 600 of FIG. 6. An example process flow of such complementary operations are illustrated in flowchart 700 FIG. 7. Flowchart 700 begins in operation 705 in which an access point device provides traffic to a client device via a wireless network using a first MAC address for the client device. For example, operation 705 may be embodied as operations 216, 316 or 416 of FIGS. 2-4, respectively.

In operation 710, the access point device obtains a target wake time signaling message from the client device. The target wake time signaling messages indicates a target wake time for the client devise, as well as a second Media Access Control address for the client device. For example, operation 710 may be embodied as access point devices 205, 305 or 405 receiving messages 220, 320 or 420 of FIG. 2-4, respectively.

Finally, in operation 715, the access point provides traffic to the client device after the target wake time via the wireless network using the second Media Access Control address for the client device. For example, operation 715 may be embodied as operations 230, 330 or 430 of FIG. 2-4, respectively.

Figure 8:
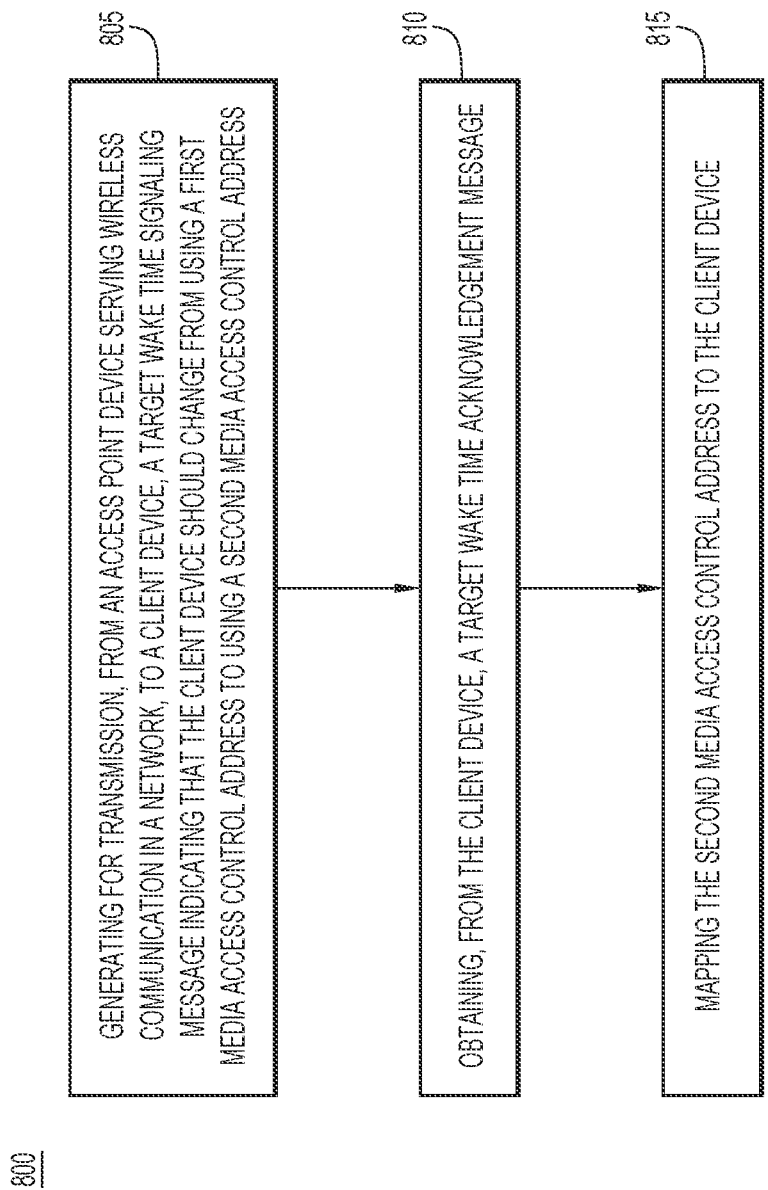
FIG. 8 is a flowchart illustrating a third process flow implementing RCM signaling through TWT, according to an example embodiment.

With reference now made to FIG. 8, depicted therein is a flowchart 800 illustrating a generalized process flow for implementing the RCM via TWT signaling message techniques disclosed herein where the access point device initiates the RCM operations via a TWT signaling message.

Flowchart 800 begins in operation 805 where an access point device generates a target wake time signaling message for transmission to a client device. The access point device serves wireless communication in a network, and the target wake time signaling message indicates that the client device should change from using a first Media Access Control address to using a second Media Access Control address. For example, operation 805 may be embodied as the generating of one or more of messages 514a, 514b, 516a or 516b of FIG. 5.

In operation 810, the access point device obtains a target wake time acknowledgement message from the client device. For example, operation 805 may be embodied as the obtaining of one or more of messages 518 or 520 of FIG. 5.

Finally, in operation 815, the access point device maps the second Media Access Control address to the client device. Because the second Media Access Control address has been mapped to the client device, the access point device may provide traffic to the client device and/or obtain traffic from the client device using the second Media Access Control address.

Figure 9:
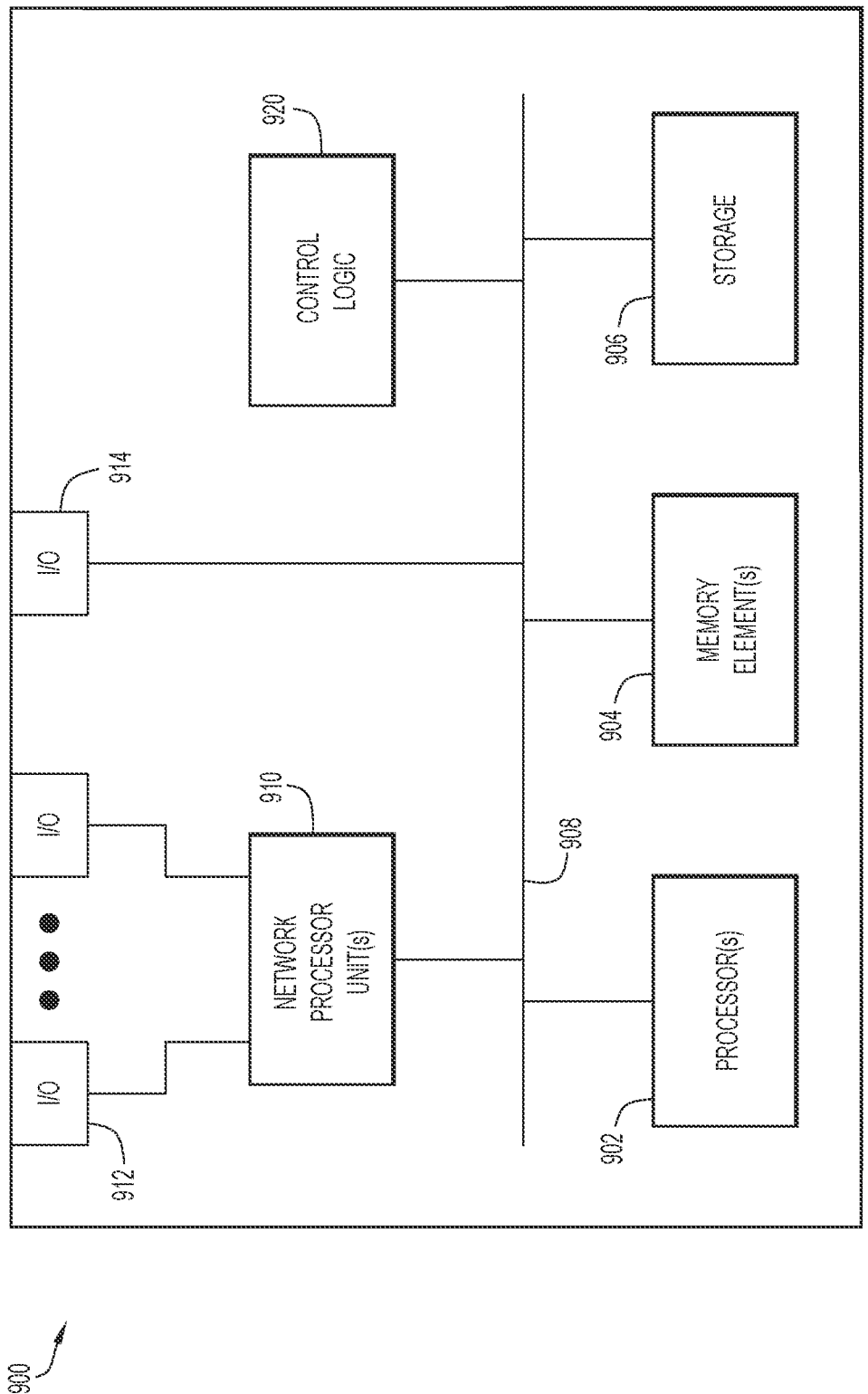
FIG. 9 is a functional block diagram of a device configured to implement the RCM signaling through TWT disclosed herein, according to an example embodiment.

Referring to FIG. 9, FIG. 9 illustrates a hardware block diagram of a device 900 that may perform functions associated with operations discussed herein in connection with the techniques depicted in FIGS. 1-8. In various embodiments, a device or apparatus, such as device 900 or any combination of devices 900, may be configured as any entity/entities as discussed for the techniques depicted in connection with FIGS. 1-8 in order to perform operations of the various techniques discussed herein. For example, device 900 shown in FIG. 9 is may be representative of a wireless client device configured to perform the client device operations described herein, or representative a wireless access point device configured to perform the access point device operations described.

In at least one embodiment, the device 900 may be any apparatus that may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for device 900 can overlap in any manner and are not limited to the specific allocation of instructions and/or operations described herein.

In at least one embodiment, processor(s) 902 is/are at least one hardware processor configured to execute various tasks, operations and/or functions for device 900 as described herein according to software and/or instructions configured for device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with device 900, and/or logic configured for memory element(s) 904 and/or storage 906. For example, any logic described herein (e.g., control logic 920) can, in various embodiments, be stored for device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of device 900 to communicate in order to exchange information and/or data. Bus 908 can be implemented with any architecture designed for passing control, data and/or information between processors, memory elements/storage, peripheral devices, and/or any other hardware and/or software components that may be configured for device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of device 900; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, provided for herein is an extension of the techniques described in the IEEE 802.11 family of standards. The disclosed extension uses TWT operations (e.g., signaling messages) to also signal RCM parameters between client devices and access point devices. Accordingly, the present disclosure provides for methods that include: determining, at a client device operating in a wireless network, a target wake time for the client device; determining, at the client device, that the client device will change from using a first Media Access Control address to using a second Media Access Control address; and generating for transmission, from the client device to an access point device that serves wireless communication in the wireless network, a target wake time signaling message indicating the target wake time for the client device and the second Media Access Control address.

Other methods provided for herein include: generating for transmission, from an access point device serving wireless communication in a network, to a client device, a target wake time signaling message indicating that the client device should change from using a first Media Access Control address to using a second Media Access Control address; obtaining, from the client device, a target wake time acknowledgement message; and mapping the second Media Access Control address to the client device.

The techniques of this disclosure also provide for apparatuses that include one or more network interfaces configured to communicate in a network, as well as one or more processors. The one or more processors are configured to: determine a target wake time for the apparatus; determine that the apparatus will change from using a first Media Access Control address to using a second Media Access Control address; and generate for transmission, via the one or more network interfaces to an access point device that serves wireless communication in the wireless network, a target wake time signaling message indicating the target wake time for the apparatus and the second Media Access Control address.

Other apparatuses provided for herein include one or more network interfaces configured to communicate in a network, and one or more processors that are configured to: generate for transmission, from an access point device serving wireless communication in the network, to a client device, a target wake time signaling message indicating that the client device should change from using a first Media Access Control address to using a second Media Access Control address; obtain, via the one or more network interfaces from the client device, a target wake time acknowledgement message; and map the second Media Access Control address to the client device.

The techniques of the present disclosure also provide for one or more tangible, non-transitory computer readable mediums. The mediums are encoded with instructions. The instructions are configured such that, when they are executed by one or more processors, the instructions cause the processors to: determine, at a client device operating in a wireless network, a target wake time for the client device; determine, at the client device, that the client device will change from using a first Media Access Control address to using a second Media Access Control address; and generate for transmission, from the client device to an access point device that serves wireless communication in the wireless network, a target wake time signaling message indicating the target wake time for the client device and the second Media Access Control address.

Other tangible, non-transitory computer readable mediums provided for herein are encoded with instructions that when executed by one or more processors cause the processors to: generate for transmission, from an access point device serving wireless communication in a network, to a client device, a target wake time signaling message indicating that the client device should change from using a first Media Access Control address to using a second Media Access Control address; obtain, from the client device, a target wake time acknowledgement message; and map the second Media Access Control address to the client device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    determining, at a client device operating in a wireless network, a target wake time for the client device;
    determining, at the client device, that the client device will change from using a first Media Access Control address to using a second Media Access Control address;
    generating for transmission, from the client device to an access point device that serves wireless communication in the wireless network, a target wake time signaling message indicating the target wake time for the client device and the second Media Access Control address;
    entering the client device into a sleep state;
    entering the client device into a wake state after the client device has been in the sleep state;
    obtaining, at the client device, and providing, from the client device, traffic using the second Media Access Control address or a third Media Access Control address after entering the client device into the wake state;
    obtaining, from the access point device, a target wake time response message indicating the third Media Access Control address to use as an alternative to the second Media Access Control address;
    entering the client device into the sleep state in response to receiving the target wake time response message; and
    entering the client device into the wake state at the target wake time for the client device.

2. The method of claim 1, wherein generating for transmission comprises generating the target wake time signaling message for transmission prior to the client device using the second Media Access Control address.

3. The method of claim 1, wherein generating the target wake time signaling message comprises generating the target wake time signaling message indicating that the target wake time signaling message was sent from a device utilizing the second Media Access Control address.

4. The method of claim 1, wherein:
    the first Media Access Control address identifies the client device in the wireless network prior to the target wake time; and
    the second Media Access Control address or the third Media Access Control address identifies the client device in the wireless network after the target wake time.

5. A method comprising:
    determining, at a client device operating in a wireless network, a target wake time for the client device;
    determining, at the client device, that the client device will change from using a first Media Access Control address to using a second Media Access Control address;
    generating for transmission, from the client device to an access point device that serves wireless communication in the wireless network, a target wake time signaling message indicating the target wake time for the client device and the second Media Access Control address;
    entering the client device into a sleep state;
    entering the client device into a wake state after the client device has been in the sleep state;
    obtaining, at the client device, and providing, from the client device, traffic using the second Media Access Control address or a third Media Access Control address after entering the client device into the wake state;
    obtaining, from the access point device, a target wake time response message indicating an alternative target wake time for the client device;
    entering the client device into the sleep state in response to receiving the target wake time response message; and
    entering the client device into the wake state at the alternative target wake time for the client device.

6. The method of claim 5, wherein generating for transmission comprises generating the target wake time signaling message for transmission prior to the client device using the second Media Access Control address.

7. The method of claim 5, wherein generating the target wake time signaling message comprises generating the target wake time signaling message indicating that the target wake time signaling message was sent from a device utilizing the second Media Access Control address.

8. The method of claim 5, wherein:
the first Media Access Control address identifies the client device in the wireless network prior to the target wake time; and
the second Media Access Control address or the third Media Access Control address identifies the client device in the wireless network after the target wake time.

9. An apparatus comprising:
one or more network interfaces configured to communicate in a wireless network; and
one or more processors configured to:
  determine a target wake time for the apparatus;
  determine that the apparatus will change from using a first Media Access Control address to using a second Media Access Control address;
  generate for transmission, via the one or more network interfaces to an access point device that serves wireless communication in the wireless network, a target wake time signaling message indicating the target wake time for the apparatus and the second Media Access Control address;
  enter the apparatus into a sleep state;
  enter the apparatus into a wake state after the apparatus has been in the sleep state;
  obtain, via the one or more network interfaces, and provide, via the one or more network interfaces, traffic using the second Media Access Control address or a third Media Access Control address after entering into the wake state;
  obtain, via the one or more network interfaces from the access point device, a target wake time response message indicating the third Media Access Control address to use as an alternative to the second Media Access Control address;
  enter the apparatus into the sleep state in response to receiving the target wake time response message; and
  enter the apparatus into the wake state at the target wake time.

10. The apparatus of claim 9, wherein the one or more processors are configured to generate the target wake time signaling message by generating the target wake time signaling message prior to the apparatus using the second Media Access Control address.

11. The apparatus of claim 9, wherein the one or more processors are configured to generate the target wake time signaling message by generating the target wake time signaling message indicating that the target wake time signaling message was sent from a device utilizing the second Media Access Control address.

12. The apparatus of claim 9, wherein:
the first Media Access Control address identifies the apparatus in the wireless network prior to the target wake time; and
the second Media Access Control address or the third Media Access Control address identifies the apparatus in the wireless network after the target wake time.

13. An apparatus comprising:
one or more network interfaces configured to communicate in a wireless network; and
one or more processors configured to:
  determine a target wake time for the apparatus;
  determine that the apparatus will change from using a first Media Access Control address to using a second Media Access Control address;
  generate for transmission, via the one or more network interfaces to an access point device that serves wireless communication in the wireless network, a target wake time signaling message indicating the target wake time for the apparatus and the second Media Access Control address;
  enter the apparatus into a sleep state;
  enter the apparatus into a wake state after the apparatus has been in the sleep state;
  obtain, via the one or more network interfaces, and provide, via the one or more network interfaces, traffic using the second Media Access Control address or a third Media Access Control address after entering into the wake state;
  obtain, via the one or more network interfaces from the access point device, a target wake time response message indicating an alternative target wake time for the apparatus;
  enter the apparatus into the sleep state in response to receiving the target wake time response message; and
  enter the apparatus into the wake state at the alternative target wake time for the apparatus.

14. The apparatus of claim 13, wherein the one or more processors are configured to generate the target wake time signaling message by generating the target wake time signaling message prior to the apparatus using the second Media Access Control address.

15. The apparatus of claim 13, wherein the one or more processors are configured to generate the target wake time signaling message by generating the target wake time signaling message indicating that the target wake time signaling message was sent from a device utilizing the second Media Access Control address.

16. The apparatus of claim 13, wherein:
the first Media Access Control address identifies the apparatus in the wireless network prior to the target wake time; and
the second Media Access Control address or the third Media Access Control address identifies the apparatus in the wireless network after the target wake time.

17. A method comprising:
determining, at a client device operating in a wireless network, a target wake time for the client device;
determining, at the client device, that the client device will change from using a first Media Access Control address to using a second Media Access Control address;
generating for transmission, from the client device to an access point device that serves wireless communication in the wireless network, a target wake time signaling message indicating the target wake time for the client device and the second Media Access Control address;
entering the client device into a sleep state;
entering the client device into a wake state after the client device has been in the sleep state; and
obtaining, at the client device, and providing, from the client device, traffic using the second Media Access Control address or a third Media Access Control address after entering the client device into the wake state,
wherein the first Media Access Control address identifies the client device in the wireless network prior to the target wake time, and the second Media Access Control address or the third Media Access Control address identifies the client device in the wireless network after the target wake time.

18. The method of claim 17, wherein generating for transmission comprises generating the target wake time signaling message for transmission prior to the client device using the second Media Access Control address.

19. The method of claim 17, wherein generating the target wake time signaling message comprises generating the target wake time signaling message indicating that the target wake time signaling message was sent from a device utilizing the second Media Access Control address.

20. The method of claim 17, further comprising the client device:
- obtaining, from the access point device, a target wake time response message indicating the third Media Access Control address to use as an alternative to the second Media Access Control address;
- entering the client device into the sleep state in response to receiving the target wake time response message; and
- entering the client device into the wake state at the target wake time for the client device.

21. The method of claim 17, further comprising the client device:
- obtaining, from the access point device, a target wake time response message indicating an alternative target wake time for the client device;
- entering the client device into the sleep state in response to receiving the target wake time response message; and
- entering the client device into the wake state at the alternative target wake time for the client device.

* * * * *